United States Patent [19]
Walter et al.

[11] Patent Number: 5,852,872
[45] Date of Patent: Dec. 29, 1998

[54] TECHNIQUE FOR JOINING DISSIMILAR SIZED ELECTRICAL LEADS

[75] Inventors: Jeryle L. Walter, Newhall; Terry Sheetz, Orange, both of Calif.

[73] Assignee: Pacesetter, Inc., Sylmar, Calif.

[21] Appl. No.: 843,477

[22] Filed: Apr. 16, 1997

[51] Int. Cl.$^6$ .................................................. H01R 43/02
[52] U.S. Cl. ........................... 29/860; 607/122; 607/125
[58] Field of Search ................................ 607/122, 125; 29/825

[56] References Cited

U.S. PATENT DOCUMENTS

| | | |
|---|---|---|
| 376,750 | 1/1888 | Murphy . |
| 1,363,355 | 12/1920 | Sander . |
| 1,990,077 | 2/1935 | Kershaw ................................ 113/112 |
| 3,517,150 | 6/1970 | McIntosh et al. ....................... 219/9.5 |
| 4,922,072 | 5/1990 | Topel et al. ............................ 219/56.1 |
| 5,014,720 | 5/1991 | Barcel et al. ............................ 607/122 |
| 5,330,520 | 7/1994 | Maddison et al. ...................... 607/122 |
| 5,383,922 | 1/1995 | Zipes et al. ............................. 607/122 |
| 5,569,883 | 10/1996 | Walter et al. ........................ 607/122 X |
| 5,649,974 | 7/1997 | Nelson et al. ......................... 29/825 X |

FOREIGN PATENT DOCUMENTS

| | | |
|---|---|---|
| 51-44538 | 4/1976 | Japan . |
| 53-40890 | 4/1978 | Japan . |

Primary Examiner—Carl J. Arbes

[57] ABSTRACT

An electrical joint is provided between first and second electrical leads having different inner diameters. It comprises an electrically conductive transition post including a disk-shaped a separation member, a first cylindrical mounting post having a first diameter integral with the separation member and extending away therefrom in a first direction, and a second cylindrical mounting post having a second diameter integral with the separation member and extending away therefrom in a second direction generally opposite the first direction. The separation member lies in a plane transverse to the longitudinal axis of the first and second mounting posts and has a diameter greater than that of either the first or the second mounting post. A first electrical lead is fittingly received on the first mounting post and a second electrical lead is fittingly received on the second mounting post. In each instance, the free ends of the electrical leads abut the separation member. Thereupon, the first and second electrical leads are welded to the first and second mounting posts, respectively, such that electrical continuity is achieved between the first and second electrical leads. In another embodiment, each of the first and second mounting posts may have a threaded outer peripheral surface for engageably receiving thereon an associated one of the electrical leads.

2 Claims, 1 Drawing Sheet

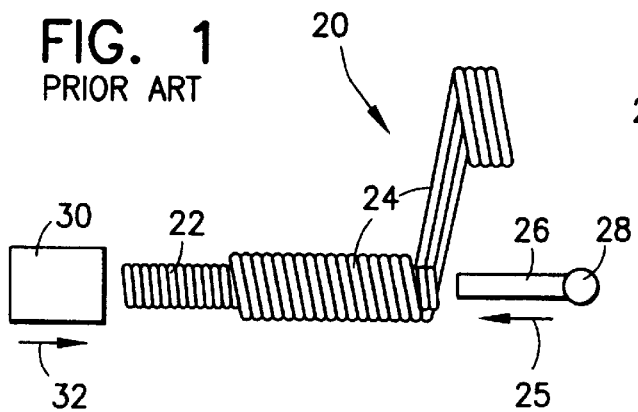
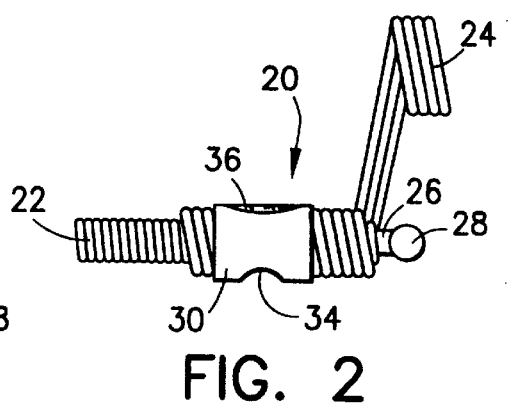
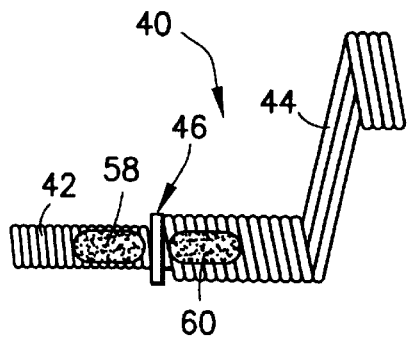
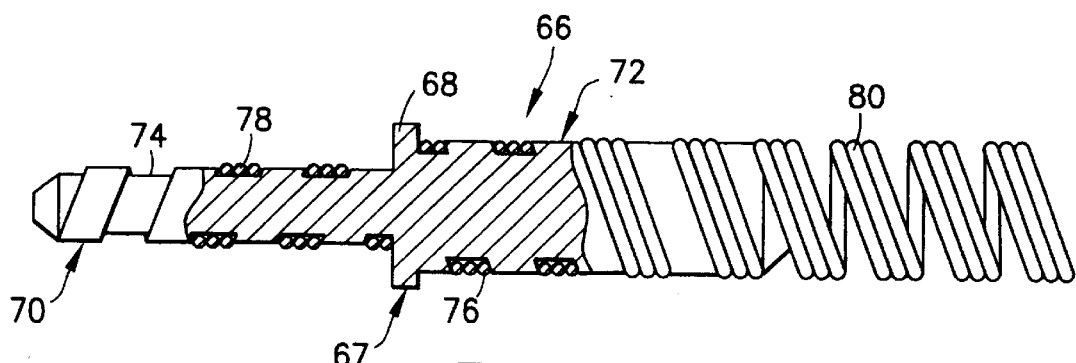

TECHNIQUE FOR JOINING DISSIMILAR SIZED ELECTRICAL LEADS

FIELD OF THE INVENTION

This invention relates generally to a technique for making electrical connections and, more particularly, to a device and method for enabling a superior electrical joint to be achieved between electrical windings or leads having different diameters.

BACKGROUND OF THE INVENTION

Electrical leads of the type used with implantable medical devices such as pacemakers and defibrillators utilize conductor coil having a helical configuration rather than a single straight strand. It is in this context that the present invention will be described.

The joining of elongate articles has long been of concern. For example, U.S. Pat. No. 376,750 to Murphy and U.S. Pat. No. 1,990,077 to Kershaw both disclose solutions for joining pipes. In each instance, an internal sleeve transcends the opposed ends of two lengths of pipe to be joined after which the joint is completed by welding.

The uniting of cable ends of similar diameter is disclosed in U.S. Pat. No. 1,363,355 to Sander, wherein close fitting metallic sleeves are applied to, and preferably flush with, the ends of each cable. Both ends are then inserted into clamps of a butt welding machine by means of which the sleeves and strands are all welded to each other in one composite mass.

In U.S. Pat. No. 3,517,150 to McIntosh et al., axially aligned abutting wires of different diameters are held together by a single coil spring of hard solder wire. The joint is induction heated, fusing the solder to form the junction.

A method of connecting a relatively large diameter, multistrand wire with a relatively small diameter wire is disclosed in U.S. Pat. No. 4,922,072 to Topel et al. First, a portion of the large diameter, multistrand wire is flattened into a body of reduced first transverse dimension and an increased second transverse dimension. Simultaneously, the strands of the body are heat welded into a unitary coherent mass. Second, outer portions of the unitary coherent mass are cut away to reduce the increased second transverse dimension of the mass produced by the flattening step. Finally, the unitary coherent mass is heat welded to the relatively small diameter wire.

It was in light of the foregoing as indicative of the prior art that the present invention was conceived and has now been reduced to practice.

SUMMARY OF THE INVENTION

The present invention relates to an electrical joint provided between first and second electrical leads having different inner diameters. It comprises an electrically conductive transition post including a disk-shaped a separation member, a first cylindrical mounting post having a first diameter integral with the separation member and extending away therefrom in a first direction, and a second cylindrical mounting post having a second diameter integral with the separation member and extending away therefrom in a second direction generally opposite the first direction. The separation member lies in a plane transverse to the longitudinal axis of the first and second mounting posts and has a diameter greater than that of either the first or the second mounting post. A first electrical lead is fittingly received on the first mounting post and a second electrical lead is fittingly received on the second mounting post. In each instance, the free ends of the electrical leads abut the separation member. Thereupon, the first and second electrical leads are welded to the first and second mounting posts, respectively, such that electrical continuity is achieved between the first and second electrical leads. In another embodiment, each of the first and second mounting posts may have a threaded outer peripheral surface for engageably receiving thereon an associated one of the electrical leads.

In a typical application, lead model 1368 manufactured by Pacesetter, Inc. of Sylmar, Calif., utilizes a bifurcation section that transitions from a quad-polar configuration to two sets of offset windings. In this transition, there are windings that are 0.004" in diameter that must transition to 0.005" diameter windings for resistance purposes. The invention provides a means to perform this transition in a timely yet technically feasible manner.

The current, or known, design involves sliding a weld rod into the small diameter winding which is then slid inside the larger winding. Next, a weld ring is positioned over these windings. The final assembly step is to crimp all of the components together using a specially designed crimp tool. This ensures that all materials are firmly touching each other. This subassembly is then laser welded which ensures that all components are electrically and mechanically attached together.

The new approach of the invention involves using a double sided mounting post with each side being of a different diameter. These diameters are designed so that there is always a compression fit between the inner diameter of the winding and the post outside diameter. This "self fixturing" is useful in that the subassemblies can be handled without concern of their parting at or during the laser welding operation. It also, eliminates the need for sophisticated tooling to the hold all components together during the welding operation.

In another embodiment of the invention, each mounting post may incorporate a square or acme thread configuration. The purpose of this construction is to provide a positive lock for the conductors rather than just depend on the secondary operation of the welding, laser or otherwise. A coat of epoxy could then be applied if the materials used in the assembly are of dissimilar alloys that would not be conducive to laser welding.

Accordingly, a primary object of the present invention is to provide a technique for making electrical connections for joining electrical leads.

Another object of the invention is to provide a device and method for enabling an electrical joint between electrical windings or leads having different diameters.

Yet another object of the present invention is to provide such a technique by means of which a self fixturing weld joint is accomplished.

A further object of the present invention is to provide such a technique which utilizes a transition post which comprises a central disk as a separation member lying in a plane transverse to the longitudinal axis of first and second cylindrical mounting posts, the central disk having a diameter greater than that of either the first or the second mounting post, the first mounting post having a first diameter and being integral with the central disk and extending away therefrom in a first direction, the second mounting post having a second diameter and being integral with the central disk axially aligned with said first mounting post and extending away therefrom in a second direction opposite the first direction, the first mounting post being adapted to fittingly receive thereon a first electrical lead and a second mounting post adapted to fittingly receive thereon a second electrical lead.

Still another object of the invention is to provide such a transition post wherein each of the first and second mounting posts has a threaded outer peripheral surface for engageably receiving an associated one of the electrical leads thereon.

Yet a further object of the present invention is to provide such an electrical joint which utilizes like alloys in all components to achieve an ideal welded joint.

Still a further object of the present invention is to provide such an electrical joint which utilizes dissimilar alloys in its components yet can achieve an ideal welded joint with the use of epoxy glue or conductive adhesive.

Yet another object of the invention is to provide such an electrical joint which facilitates the transition of one diameter of winding to another without concern for the actual wire diameter.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and together with the description, serve to explain the principles of the invention in general terms. Like numerals refer to like parts throughout the disclosure.

BRIEF DESCRIPTION OF THE DRAWINGS

FIG. 1 is an exploded diagrammatic side elevation view of an early stage of a current, or known, technique for forming an electrical joint between electrical windings or leads having different diameters;

FIG. 2 is a side elevation view of a substantially completed electrical joint between electrical windings or leads having different diameters formed by a current, or known, technique;

FIG. 3 is a detail side elevation view of a transition post according to the present invention;

FIG. 4 is a side elevation view of an early stage of a technique embodying the invention for forming an electrical joint between electrical windings or leads having different diameters;

FIG. 5 is a side elevation view of a substantially completed electrical joint between electrical windings or leads having different diameters formed by the technique of the invention; and FIG. 6 is a side elevation view, certain parts being cut away and shown in section, of another embodiment of the technique of the invention.

DETAILED DESCRIPTION OF THE PREFERRED EMBODIMENTS

Turn now to the drawings and, initially, to FIGS. 1 and 2 which generally illustrate the current, or known, design of electrical joint 20 for transitioning from an electrical lead 22 being a winding of lesser diameter to a lead 24 being a winding of greater diameter. The procedure involves sliding into the lead 22 in the direction of an arrow 25 a weld rod 26 which terminates at one end at a head 28 which is of greater diameter than the remainder of the rod. The head 28 serves as a stop to prevent further entry of the weld rod 26 into the lead 22. Thereupon, the assembly of the lead 22 and of the weld rod 26 is slid inside the larger lead 24. Next, a weld ring 30 is advanced in the direction of an arrow 32 and positioned over the assembly of the leads 22, 24 and the weld rod 26 as seen in FIG. 2. The final assembly step is to crimp all of the components together using a suitable crimp tool (not shown) indicated by a crimp indentation 34. This series of operations ensures that all materials are firmly touching each other. This assembly is then laser welded, as indicated at 36, which ensures that all components are electrically and mechanically joined together.

Turn now to FIGS. 3, 4 and 5 for a description of a first embodiment of the invention. To this end, an electrical joint 40 is provided between a first electrical lead 42 of lesser diameter and a second electrical lead 44 of greater diameter. While in no way intended to limit the invention, the winding of the first electrical lead may typically have an inner diameter of 0.004 inch and the winding of the second electrical lead may have an inner diameter of 0.005 inch.

An electrically conductive transition post 46 (see especially FIG. 3) enables the joint 40 to be readily achieved in a superior manner and includes a separation member in the form of a central disk 48 lying in a plane transverse to the longitudinal axis of first and second mounting posts 50, 52, respectively. The central disk 48 has a diameter greater than that of either of the first and second mounting posts.

The first mounting post 50 is cylindrical, is integral with the central disk 48 and extends away from the central disk in a first direction as clearly seen in FIG. 3. The second mounting post 52 is also cylindrical, is integral with the central disk 48 and extends away from the central disk in a second direction, generally opposite the first direction, again as clearly seen in FIG. 3.

The outer diameter of the mounting post 50 and the inner diameter of the electrical lead 42 are so chosen that the lead 42 is fittingly received on the mounting post 50 as it is advanced in the direction of an arrow 54 (FIG. 4). Similarly, the outer diameter of the mounting post 52 and the inner diameter of the electrical lead 44 are so chosen that the lead 44 is fittingly received on the mounting post 52 as it is advanced in the direction of an arrow 56. It is preferred that each of the electrical leads 42, 44 abut the central disk 48 whereupon they are laser welded to their associated mounting posts, respectively, as indicated at 58 for the former and at 60 for the latter. In this manner, electrical continuity is readily achieved between the first and second electrical leads 42, 44 with minimal addition to the mass and size of the leads themselves.

In FIG. 6 is illustrated a modified electrical joint 66 comprising a transition post 67 with a central disk 68 and opposed integral mounting posts 70, 72, the former being of lesser diameter, the latter being of greater diameter as previously described. However, in this instance, each of the mounting posts has a threaded outer peripheral surface 74, 76, respectively, for engageably receiving an associated electrical lead 78, 80 thereon. As earlier noted, each threaded outer peripheral surface 74, 76 is preferably a square or acme thread configuration. The purpose of this construction is to provide a positive lock for the leads rather than depending only on the secondary operation of the weld joint. In the event the materials used in the assembly are of dissimilar alloys that would not be conducive to laser welding, a coat of epoxy glue or conductive adhesive could then be applied in place of the laser weld.

While preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. A method of joining first and second electrical leads having different inner diameters comprising the steps of:

(a) providing an electrically conductive transition post including a separation member, a first cylindrical mounting post having a first diameter integral with said separation member and extending away therefrom in a first direction, and a second cylindrical mounting post having a second diameter integral with said separation member axially aligned with said first mounting post and extending away therefrom in a second direction opposite said first direction;

(b) fittingly sliding a first electrical lead onto the first mounting post so that a free end thereof abuts the separation member;

(c) fittingly sliding a second electrical lead onto the second mounting post so that a free end thereof abuts the separation member;

(d) welding the first electrical lead to the first mounting post; and (e) welding the second electrical lead to the second mounting post.

2. A method of joining first and second electrical leads as set forth in claim 1 including the step of:

(f) forming on each of the first and second mounting posts a threaded outer peripheral surface for engageably receiving an associated one of the electrical leads thereon; wherein step (b) includes the step of:

(g) threadedly engaging the first electrical lead with the first mounting post so that the free end thereof abuts the separation member; and wherein step (c) includes the step of:

(h) threadedly engaging the second electrical lead with the second mounting post so that the free end thereof abuts the separation member.

* * * * *